US009088051B2

United States Patent
Roh et al.

(10) Patent No.: US 9,088,051 B2
(45) Date of Patent: Jul. 21, 2015

(54) POSITIVE ELECTRODE PROTECTIVE LAYER COMPOSITION, RECHARGEABLE LITHIUM BATTERY INCLUDING PROTECTIVE LAYER FOR POSITIVE ELECTRODE AND METHOD OF MANUFACTURING SAME

(75) Inventors: Sae-Weon Roh, Yongin-si (KR); Yong-Chul Park, Yongin-si (KR); Sung-Soo Kim, Yongin-si (KR); So-Hyun Hur, Yongin-si (KR); In-Haeng Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 515 days.

(21) Appl. No.: 13/204,599

(22) Filed: Aug. 5, 2011

(65) Prior Publication Data

US 2012/0107694 A1    May 3, 2012

(30) Foreign Application Priority Data

Nov. 2, 2010   (KR) .................... 10-2010-0108350

(51) Int. Cl.
| | |
|---|---|
| H01M 2/16 | (2006.01) |
| H01M 10/052 | (2010.01) |
| H01M 4/36 | (2006.01) |
| H01M 10/0562 | (2010.01) |
| H01M 10/0565 | (2010.01) |
| H01M 10/0525 | (2010.01) |
| H01M 4/62 | (2006.01) |
| H01M 4/131 | (2010.01) |

(52) U.S. Cl.
CPC ............ *H01M 10/052* (2013.01); *H01M 4/366* (2013.01); *H01M 10/0562* (2013.01); *H01M 10/0565* (2013.01); *H01M 2/16* (2013.01); *H01M 4/131* (2013.01); *H01M 4/628* (2013.01); *H01M 10/0525* (2013.01); *H01M 2300/0045* (2013.01); *Y02E 60/122* (2013.01); *Y10T 29/49115* (2015.01)

(58) Field of Classification Search
USPC ...................................... 429/126, 5
See application file for complete search history.

(56) References Cited

U.S. PATENT DOCUMENTS

| | | | | |
|---|---|---|---|---|
| 5,869,208 | A | * | 2/1999 | Miyasaka ............ 429/224 |
| 7,507,503 | B2 | | 3/2009 | Amine et al. |
| 7,544,443 | B2 | | 6/2009 | Fujihara et al. |
| 7,906,237 | B2 | | 3/2011 | Adachi et al. |

(Continued)

FOREIGN PATENT DOCUMENTS

| | | |
|---|---|---|
| DE | 10 2007 019 663 A1 | 10/2008 |
| JP | 2003-068358 | 3/2003 |

(Continued)

OTHER PUBLICATIONS

Extended European Search Report dated Feb. 15, 2012 for Application No. 11187267.7, 5 pages.
KIPO Notice of Allowance dated Apr. 30, 2012, for priority application No. KR 10-2010-0108350 (5 pages).
Korean Patent Abstract for Publication No. KR 10-2003-0042288 A, published May 28, 2003, in the name of Nam Sun Choi et al. (2 pages).

(Continued)

*Primary Examiner* — Jeremiah Smith
(74) *Attorney, Agent, or Firm* — Christie, Parker & Hale, LLP

(57) ABSTRACT

A positive electrode protective layer composition of a rechargeable lithium battery includes a polymer compound and an ionic liquid including a borate-based anion. A rechargeable lithium battery includes the positive electrode protective layer. A method of manufacturing the same is also provided.

7 Claims, 2 Drawing Sheets

(56) References Cited

U.S. PATENT DOCUMENTS

| | | |
|---|---|---|
| 2002/0182488 A1 | 12/2002 | Cho et al. |
| 2004/0106037 A1 | 6/2004 | Cho et al. |
| 2005/0003277 A1 | 1/2005 | Lee et al. |
| 2006/0216612 A1 | 9/2006 | Jambunathan et al. |
| 2008/0014501 A1 | 1/2008 | Skotheim et al. |
| 2008/0045615 A1* | 2/2008 | Best et al. ............... 521/27 |
| 2008/0096103 A1 | 4/2008 | Naarmann |
| 2009/0061313 A1 | 3/2009 | Tadano |
| 2009/0075176 A1* | 3/2009 | Singh et al. ............ 429/309 |
| 2009/0226817 A1 | 9/2009 | Angell et al. |
| 2009/0297935 A1* | 12/2009 | Visco et al. ............ 429/144 |
| 2010/0183917 A1 | 7/2010 | Holzapfel et al. |
| 2011/0104564 A1 | 5/2011 | Matsui |

FOREIGN PATENT DOCUMENTS

| | | |
|---|---|---|
| JP | 2003-536229 | 12/2003 |
| JP | 2006-147288 | 6/2006 |
| JP | 2006-202745 A | 8/2006 |
| JP | 2007-273448 | 10/2007 |
| JP | 2008-533650 | 8/2008 |
| JP | 2009-252489 | 10/2009 |
| JP | 2012-209145 | 10/2012 |
| KR | 10-2004-0026370 A | 3/2004 |
| KR | 10-0425585 B1 | 3/2004 |
| KR | 10-2005-0005352 A | 1/2005 |
| KR | 10-0779162 B1 | 11/2007 |
| KR | 10-2008-0010166 A | 1/2008 |
| KR | 10-2008-0017379 | 2/2008 |
| KR | 10-2008-0057604 A | 6/2008 |

OTHER PUBLICATIONS

JPO Office action dated May 7, 2013, for corresponding Japanese Patent application 2011-174685, (4 pages).

Patent Abstracts of Japan, and English machine translation of Japanese Publication 2006-147288, dated Jun. 8, 2006, listed above, (24 pages).

Patent Abstracts of Japan, and English machine translation of Japanese Publication 2012-209145, dated Oct. 25, 2012, listed above, (16 pages).

European Patent Office action, dated Jan. 29, 2013, for Application No. 11 187 267.7-1227, 5 pages.

SIPO Office action dated Nov. 8, 2013, with English translation, for corresponding Chinese Patent application 201110340853.6, (10 pages).

SIPO Office Action dated Mar. 28, 2014, with English translation, for corresponding Chinese Patent Application 201110340853.6, (8 pages).

SIPO Office action dated Jun. 27, 2014, with English translation, for corresponding Chinese Patent application 201110340853.6, (6 pages).

EPO Office action dated Dec. 1, 2014, for corresponding European Patent application 11187267.7, (5 pages).

SIPO Office action dated Dec. 10, 2014, with English translation, for corresponding Chinese Patent application 201110340853.6, (7 pages).

SIPO Office action dated Sep. 24, 2014, with English translation, for corresponding Chinese Patent application 201110340853.6, (6 pages).

* cited by examiner

POSITIVE ELECTRODE PROTECTIVE LAYER COMPOSITION, RECHARGEABLE LITHIUM BATTERY INCLUDING PROTECTIVE LAYER FOR POSITIVE ELECTRODE AND METHOD OF MANUFACTURING SAME

CROSS-REFERENCE TO RELATED APPLICATION

This application claims priority to and the benefit of Korean Patent Application No. 10-2010-0108350, filed in the Korean Intellectual Property Office on Nov. 2, 2010, the entire content of which is incorporated herein by reference.

BACKGROUND

1. Field

This disclosure relates to a positive electrode protective layer composition for a rechargeable lithium battery, a rechargeable lithium battery including the positive electrode protective layer, and a method of manufacturing the same.

2. Description of Related Art

Batteries transform chemical energy generated from an electrochemical redox reaction of a chemical material in the battery into electrical energy. Such batteries are divided into primary batteries, which should be disposed of after the energy of the battery is consumed, and rechargeable batteries, which can be recharged many times. The rechargeable battery can be charged/discharged based on the reversible transformation between chemical energy and electrical energy.

Recent developments in high-tech electronics has allowed electronic devices to become small and lightweight, leading to an increase in portable electronic devices. Demands for batteries with high energy density are increasing as a power source for such portable electronic devices, and research on lithium rechargeable batteries suitable for portable electronic devices are in progress.

The rechargeable lithium battery is fabricated by injecting electrolyte into a battery cell, which includes a positive electrode including a positive active material capable of intercalating/deintercalating lithium and a negative electrode including a negative active material capable of intercalating/deintercalating lithium.

A positive active material may be composite oxide including lithium (Li) and various transition elements. However, transition elements included in a positive active material may be eluted into an electrolyte at high temperatures. This reduces the capacity and cycle-life of rechargeable batteries.

SUMMARY

One embodiment of the present invention provides a positive electrode protective layer composition that reduces elution of transition elements from a positive electrode.

Another embodiment of the present invention provides a rechargeable lithium battery including the positive electrode protective layer manufactured using the composition.

Yet another embodiment of the present invention provides a method of manufacturing the rechargeable lithium battery.

According to one embodiment of the present invention, a positive electrode protective layer composition of a rechargeable lithium battery includes a polymer compound and ionic liquid including a borate-based anion.

According to another embodiment of the present invention, a rechargeable lithium battery is provided that includes a positive electrode, a negative electrode, a separator between the positive and negative electrodes, and a positive electrode protective layer between the positive electrode and the separator. The positive electrode protective layer includes a polymer compound and a borate-based anion linked to the polymer compound.

According to anther embodiment of the present invention, a method of manufacturing a rechargeable lithium battery includes providing an electrode element including the positive electrode, the separator, and a negative electrode; mixing a polymer compound, an ionic liquid having a borate-based anion, and a solvent to provide a positive electrode protective layer composition; and coating the positive electrode protective layer composition on at least one surface of a positive electrode and a separator.

The borate-based anion may be selected from bis(oxalato)borate (BOB), difluorooxalatoborate (FOB), bis(malonato)borate (BMB), bis(perfluoropinacolato)borate (BPFPB), tetrafluoroborate, triborate ($B_3O_7^{5-}$), tetraborate ($B_4O_9^{6-}$), metaborate ($[BO_2^-]_n$), and combinations thereof.

The polymer compound may be selected from ester-containing polymer compounds, fluorine-based polymer compounds, and combinations thereof.

The ester-containing polymer compound may be selected from substituted and unsubstituted carboxylate-containing polymer compounds, substituted and unsubstituted (meth)acrylate-containing polymer compounds, and combinations thereof.

The ester-containing polymer compound include a copolymer of a first compound selected from substituted and unsubstituted carboxylate-containing polymer compounds, substituted and unsubstituted (meth)acrylate-containing polymer compounds, and combinations thereof, and a second compound may include diol-based compounds, aromatic vinyl compounds, and combinations thereof.

The ionic liquid includes a cation that may be selected from lithium cations, substituted and unsubstituted imidazolium cations, substituted and unsubstituted piperidinium cations, substituted and unsubstituted pyrrolidinium cations, substituted and unsubstituted pyrazolium cations, substituted and unsubstituted triazolium cations, substituted and unsubstituted isotriazolium cations, substituted and unsubstituted thiazolium cations, substituted and unsubstituted oxazolium cations, substituted and unsubstituted isooxazolium cations, substituted and unsubstituted pyridazinium cations, substituted and unsubstituted pyrimidinium cations, substituted and unsubstituted pyrazinium cations, substituted and unsubstituted pyridinium cations, substituted and unsubstituted isothiazolium cations, substituted and unsubstituted azathiazolium cations, substituted and unsubstituted oxothiazolium cations, substituted and unsubstituted oxaborolium cations, substituted and unsubstituted dithiazolium cations, substituted and unsubstituted selenozolium cations, substituted and unsubstituted oxaphospholium cations, substituted and unsubstituted pyrollium cations, substituted and unsubstituted borolium cations, substituted and unsubstituted furanium cations, substituted and unsubstituted thiophenium cations, substituted and unsubstituted pentazolium cations, substituted and unsubstituted indolium cations, substituted and unsubstituted indolinium cations, substituted and unsubstituted tetrazolium cations, substituted and unsubstituted benzofuranium cations, substituted and unsubstituted dibenzofuranium cations, substituted and unsubstituted benzothiophenium cations, substituted and unsubstituted dibenzothiophenium cations, substituted and unsubstituted thiadiazolium cations, substituted and unsubstituted piperazinium cations, substituted and unsubstituted morpholinium cations, substituted and unsubstituted pyranium cations, substituted and unsubstituted annolinium cations, substituted and unsubstituted phthalazinium cations, substituted and unsubstituted quinazolinium cations, substituted and unsubstituted quinazalinium cations, substituted and unsubstituted quinolinium cations, substituted and unsubstituted isoquinolinium cations, substituted and unsubstituted thazinium cations, substituted and unsubstituted oxazinium cations, substituted and unsubstituted azaannulenium cations, substituted and unsubstituted phosphonium cations, substituted and unsubstituted ammonium cations, and combinations thereof.

The positive electrode protective layer composition may further include a solvent. The polymer compound, the ionic liquid, and the solvent may be included in an amount of about 1 wt % to 20 wt %, about 1 wt % to 10 wt %, and about 70 wt % to 98 wt %, respectively, based on the total weight of the positive electrode protective layer composition.

The method of manufacturing a rechargeable lithium battery may further include hot-pressing the positive electrode protective layer composition after coating the positive electrode protective layer.

The positive electrode protective layer composition may prevent or reduce the rapid decrease of battery capacity and cycle-life by suppressing or reducing the elution of the transition element ion of a positive active material into an electrolyte at high temperatures. Thereby, it may expand the application of transition elements such as manganese which is generally not used as much due to its elution into the electrolyte. Accordingly, the kind of positive active material may be varied.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
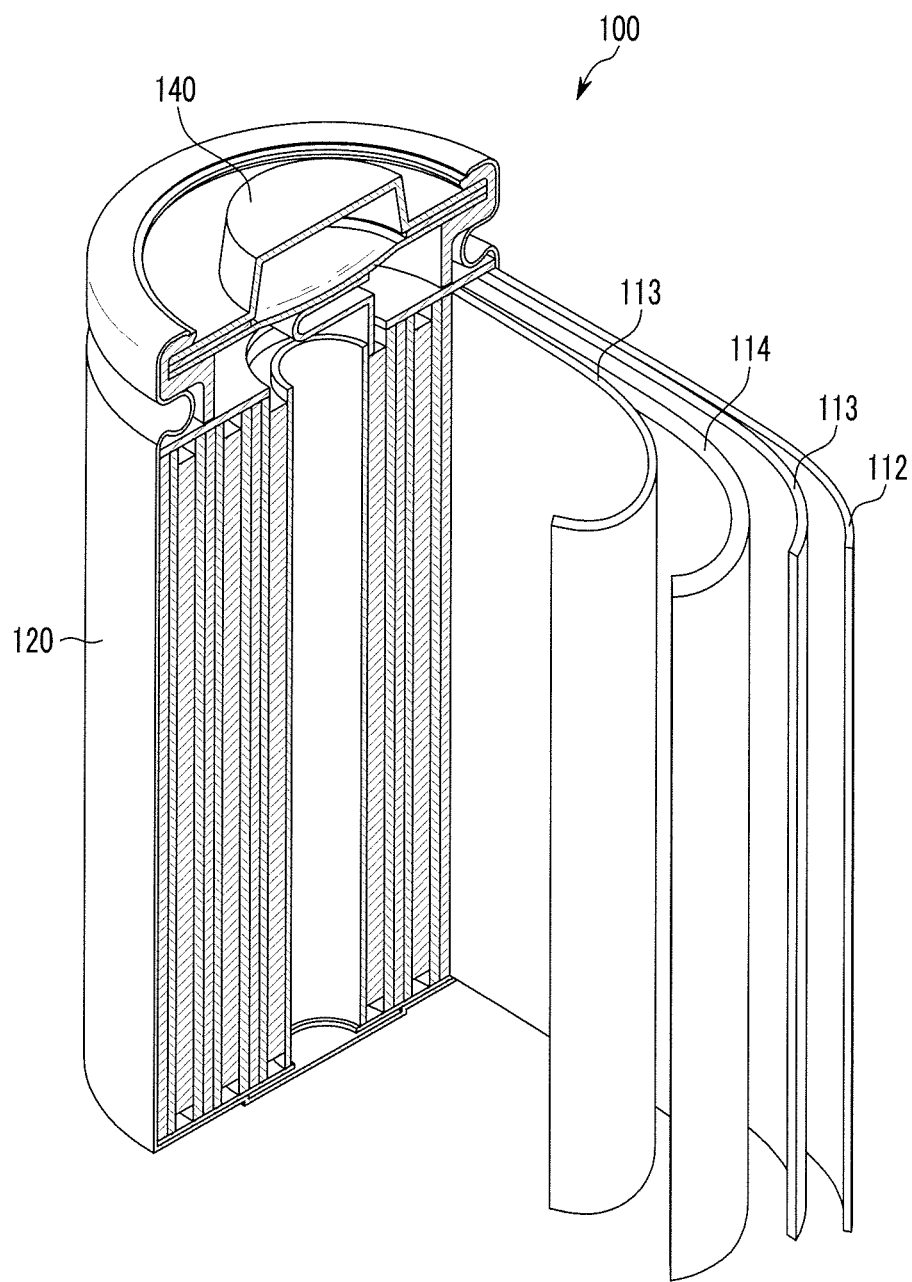
FIG. 1 is a schematic view showing a rechargeable battery according to an embodiment of the present invention.

The following detailed description references certain exemplary embodiments, examples of which are illustrated in the accompanying drawings. Throughout the description, like reference numerals refer to like elements. In this regard, the described embodiments are exemplary, and those of ordinary skill in the art will appreciate that certain modifications can be made to the described embodiments. This description is not limited to the particular embodiments described.

As used herein, when a definition is not otherwise provided, the term "substituted" refers to a compound or ion where at least one hydrogen atom is substituted with at least one substituent selected from halogens (e.g., F, Br, Cl, or I), hydroxyl groups, alkoxy groups, nitro groups, cyano groups, amino groups, azido groups, amidino groups, hydrazino groups, hydrazono groups, carbonyl groups, carbamyl groups, thiol groups, ester groups, carboxyl groups or salts thereof, sulfonic acid groups or salts thereof, phosphoric acid groups or salts thereof, C1 to C12 alkyl groups, C2 to C16 alkenyls group, C2 to C16 alkynyl groups, aryl groups, C7 to C13 arylalkyl groups, C1 to C4 oxyalkyl groups, C1 to C20 heteroalkyl groups, C3 to C20 heteroarylalkyl groups, cycloalkyl groups, C3 to C15 cycloalkenyl groups, C6 to C15 cycloalkynyl groups, heterocycloalkyl groups, and combinations thereof.

As used herein, when a definition is not otherwise provided, the term "alkyl" refers to a C1 to C12 alkyl.

As used herein, when a definition is not otherwise provided, the term "hetero" refers to a compound or ion including, e.g., 1 to 3 heteroatoms selected from N, O, S, and P.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a rechargeable lithium battery according to an embodiment of the present invention will be described by referring to FIGS. 1 and 2.

Figure 2:
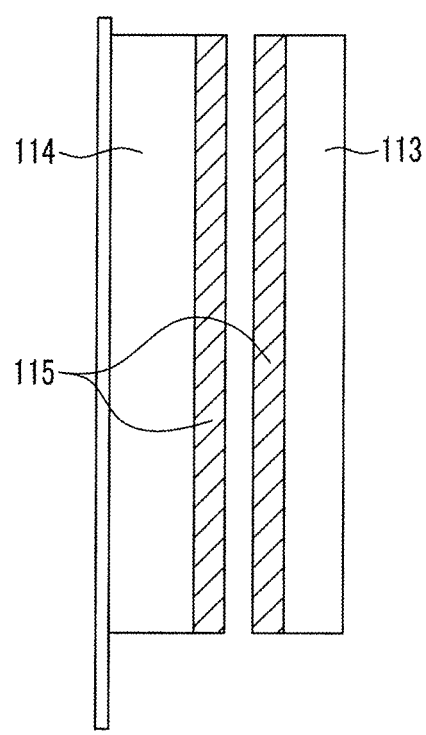
FIG. 2 is a schematic view enlarging a portion of the rechargeable lithium battery of FIG. 1.

FIG. 1 is a schematic view showing a rechargeable lithium battery according to an embodiment of the present invention, and FIG. 2 is a schematic view enlarging a portion of the rechargeable lithium battery of FIG. 1.

Referring to FIGS. 1 and 2, the rechargeable lithium battery 100 includes an electrode assembly including a positive electrode 114, a negative electrode 112, a separator 113 between the positive electrode 114 and the negative electrode 112, an electrolyte (not shown) impregnating the positive electrode 114, negative electrode 112, and separator 113, a battery case 120, and a sealing member 140 sealing the battery case 120.

The positive electrode 114 includes a current collector and a positive active material layer formed on the current collector. The current collector may include aluminum foil, but it is not limited thereto. Any suitable material for a current collector may be used. The positive active material layer includes a positive active material, a binder, and a conductive material.

For the positive active material, compounds being capable of reversibly intercalating and deintercalating lithium ions may be used. Non-limiting examples of the positive active material include composite oxides including lithium (Li) and a metal selected from cobalt (Co), manganese (Mn), nickel (Ni), and combinations thereof. One or more positive active material may be used.

The positive active material includes, for example, $Li_aA_{1-b}D_bE_2$ ($0.90 \leq a \leq 1.8$, $0 \leq b \leq 0.5$); $Li_aG_{1-b}D_bO_{2-c}J_c$ ($0.90 \leq a \leq 1.8$, $0 \leq b \leq 0.5$, $0 \leq c \leq 0.05$); $Li_aG_{2-b}D_bO_{4-c}J_c$ ($0.90 \leq a \leq 1.8$, $0 \leq b \leq 0.5$, $0 \leq c \leq 0.05$); $Li_aNi_{1-b-c}Co_bD_cE_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bD_cO_{2-\alpha}J_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bD_cO_{2-\alpha}J_2$ ($0.90 \leq a \leq 1.8$, $0 \leq b \leq 0.5$, $0 \leq c \leq 0.05$, $0 < \alpha < 2$); $Li_aNi_{1-b-c}Mn_bD_cE_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bD_cO_{2-\alpha}J_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bD_cO_{2-\alpha}J_\alpha$ ($0.90 \leq a \leq 1.8$, $0 \leq b \leq 0.5$, $0 \leq c \leq 0.05$, $0 \leq \alpha \leq 2$); $Li_aNi_bG_cL_dO_2$ ($0.90 \alpha \leq 1.8$, $0 \leq b \leq 0.9$, $0 \leq c \leq 0.5$, $0.001 \leq d \leq 0.1$); $Li_aNi_bCo_cMn_dL_eO_2$ ($0.90 \alpha \leq 1.8$, $0 \leq b \leq 0.9$, $0 \leq c \leq 0.5$, $0 \leq d$ $0.5$, $0.001 \leq e$ $\leq 0.1$); $Li_aNiL_bO_2$ ($0.90 \leq a \leq 1.8$, $0.001 \leq b \leq 0.1$); $Li_aCoL_bO_2$ ($0.90 \alpha \leq 1.8$, $0.001 \leq b \leq 0.1$); $Li_aMnL_bO_2$ ($0.90 \leq a \leq 1.8$, $0.001 \leq b \leq 0.1$); $Li_aMn_2L_bO_4$ ($0.90 \leq a \leq 1.8$, $0.001 \leq b \leq 0.1$); $QS_2$; $LiQS_2$; $V_2O_5$; $LiV_2O_5$; $LiRO_2$; $LiNiVO_4$; $Li_{(3-f)}Z_2(PO_4)_3$ ($0 \leq f \leq 2$); $Li_{(3-f)}Fe_2(PO_4)_3$ ($0 \leq f \leq 2$); and $LiFePO_4$. A is selected from Ni, Co, Mn, and combinations thereof; D is selected from Al, Ni, Co, Mn, Cr, Fe, Mg, Sr, V, a rare earth element, and combinations thereof; E is selected from O, F, S, P, and combinations thereof; G is selected from Co, Mn, and combinations thereof; J is selected from F, S, P, and combinations thereof; L is selected from Al, Cr, Mn, Fe, Mg, La, Ce, Sr, V, and combinations thereof; Q is selected from Ti, Mo, Mn, and combinations thereof; R is selected from Cr, V, Fe, Sc, Y, and combinations thereof; and Z is selected from V, Cr, Mn, Co, Ni, Cu, and combinations thereof. The positive active material may be included at about 80 wt % to about 95 wt % based on the total weight of the positive active material layer.

The binder improves binding properties of the positive active material particles to one another, and also of the positive active material layer to the current collector. Any material may be used for the binder that does not cause a chemical change in the battery and improves adherence. Examples of suitable binder materials include polyvinyl alcohol, carboxylmethyl cellulose, hydroxypropylene cellulose, diacetylene cellulose, polyvinyl chloride, carboxylated polyvinyl chloride, polyvinyl difluoride, a polymer including ethylene oxide, polyvinylpyrrolidone, polyurethane, polytetrafluoroethylene, polyvinylidene fluoride, poly(vinylidene fluoride-hexafluoropropylene) (PVdF-HFP), polyethylene, polypropylene, styrene-butadiene rubber, acrylated styrene-butadiene rubber, an epoxy resin, nylon, and the like. One or more binder material may be used. Among them, poly(vinylidene fluoride-hexafluoropropylene) (PVdF-HFP) is preferable, wherein hexafluoropropylene (HFP) may further improve the adherence of the positive active material when being included at about 4 to 20 mol % of the PVdF-NFP. The binder may be included at about 4 wt % to about 20 wt % based on the total weight of the positive active material layer.

The conductive material is included to improve electrode conductivity. Any electrically conductive material may be used as a conductive material unless it causes a chemical change. Examples of suitable conductive materials include polyphenylene derivatives, natural graphite, artificial graphite, carbon black, acetylene black, ketjen black, carbon fiber, and metal powders and metal fiber including copper, nickel, aluminum, silver, and the like. One or more conductive material may be used. The conductive material may be omitted. However, if included, the conductive material may be included at about 1 wt % to 20 wt % based on the total weight of the positive active material layer.

The separator 113 may be a single layer or multilayer, and, for example, is made of polyethylene, polypropylene, polyvinylidene fluoride, or combinations thereof. Any suitable separator material may be used.

As shown in FIG. 2, the positive electrode protective layer 115 may be formed on surfaces of the positive electrode 114 and separator 113, respectively. Alternatively, the positive electrode protective layer 115 may be formed only on the surface of the positive electrode 114 or only on the surface of the separator 113.

The positive electrode protective layer 115 may be formed by applying a positive electrode protective layer composition on each surface of the positive electrode 114 and separator 113. The positive electrode protective layer composition includes a polymer compound, ionic liquid including a borate-based anion, and a solvent.

The polymer compound may be selected from ester-containing polymer compounds, fluorine-based polymer compounds, and combinations thereof. One or more ester-containing polymer compounds or fluorine-based compounds may be used.

The ester-containing polymer compound may be selected from substituted and unsubstituted carboxylate-containing polymer compounds, substituted and unsubstituted (meth)acrylate-containing polymer compounds, and combinations thereof. The ester-containing polymer compound may be, for example, vinylacetate, methylmethacrylate, or ethylmethacrylate.

The fluorine-based polymer compound may include, for example, poly(vinylidenefluoride-hexafluoropropylene) (PVdF-HFP). When poly(vinylidenefluoride-hexafluoropropylene) (PVdF-HFP) is used, hexafluoropropylene (HFP) may be included in an amount of about 4 mol % to 20 mol % of the PVdF-HFP.

The ester-containing polymer compound may include a copolymer of a first compound selected from substituted and unsubstituted carboxylate-containing polymer compounds, substituted and unsubstituted (meth)acrylate-containing polymer compounds, and combinations thereof, and a second compound selected from diol-based compounds, aromatic vinyl compounds, and combinations thereof. The diol-based compound may be, for example, ethyleneglycol, and the aromatic vinyl compound may be, for example, styrene.

The polymer compound has a weight average molecular weight (Mw) of about 1000 to 10000.

The ionic liquid includes cations and anions, and it is a salt having liquid characteristics at room temperature.

The ionic liquid includes a borate-based anion. The borate-based anion may include any anion including substituted and unsubstituted borate ions. For example, the borate ion may be selected from bis(oxalato)borate (BOB), difluorooxalatoborate (FOB), bis(malonato)borate (BMB), bis(perfluoropinacolato)borate (BPFPB), tetrafluoroborate, triborate ($B_3O_7^{5-}$), tetraborate ($B_4O_9^{6-}$), metaborate ($[BO_2^-]_n$), and combinations thereof.

The ionic liquid also includes lithium cations or non-lithium cations. Suitable non-lithium cations include any suitable cation without a lithium cation, and, for example, may be selected from substituted and unsubstituted imidazolium cations, substituted and unsubstituted piperidinium cations, substituted and unsubstituted pyrrolidinium cations, substituted and unsubstituted pyrazolium cations, substituted and unsubstituted triazolium cations, substituted and unsubstituted isotriazolium cations, substituted and unsubstituted thiazolium cations, substituted and unsubstituted oxazolium cations, substituted and unsubstituted isooxazolium cations, substituted and unsubstituted pyridazinium cations, substituted and unsubstituted pyrimidinium cations, substituted and unsubstituted pyrazinium cations, substituted and unsubstituted pyridinium cations, substituted and unsubstituted isothiazolium cations, substituted and unsubstituted azathiazolium cations, substituted and unsubstituted oxothiazolium cations, substituted and unsubstituted oxaborolium cations, substituted and unsubstituted dithiazolium cations, substituted and unsubstituted selenozolium cations, substituted and unsubstituted oxaphospholium cations, substituted and unsubstituted pyrollium cations, substituted and unsubstituted borolium cations, substituted and unsubstituted furanium cations, substituted and unsubstituted thiophenium cations, substituted and unsubstituted pentazolium cations, substituted and unsubstituted indolium cations, substituted and unsubstituted indolinium cations, substituted and unsubstituted tetrazolium cations, substituted and unsubstituted benzofuranium cations, substituted and unsubstituted dibenzofuranium cations, substituted and unsubstituted benzothiophenium cations, substituted and unsubstituted dibenzothiophenium cations, substituted and unsubstituted thiadiazolium cations, substituted and unsubstituted piperazinium cations, substituted and unsubstituted morpholinium cations, substituted and unsubstituted pyranium cations, substituted and unsubstituted annolinium cations, substituted and unsubstituted phthalazinium cations, substituted and unsubstituted quinazolinium cations, substituted and unsubstituted quinazalinium cations, substituted and unsubstituted quinolinium cations, substituted and unsubstituted isoquinolinium cations, substituted and unsubstituted thazinium cations, substituted and unsubstituted oxazinium cations, substituted and unsubstituted azaannulenium cations, substituted and unsubstituted phosphonium cations, substituted and unsubstituted ammonium cations, and combinations thereof.

The solvent may be any solvent being capable of dissolving the polymer compound and ionic liquid. For example, the solvent may be selected from carbonate-based solvents, ester-based solvents, ether-based solvents, ketone-based solvents, and combinations thereof. The carbonate-based solvent may be at least one selected from dimethylcarbonate, diethylcarbonate, dipropylcarbonate, methylpropylcarbonate, ethylpropylcarbonate, ethylmethylcarbonate, ethylenecarbonate, propylenecarbonate, and butylenecarbonate. The ester-based solvent may be at least one selected from of γ-butyrolactone, methylacetate, ethylacetate, and propylacetate. The ether-based solvent may be selected from dibutylether. The ketone-based solvent may be selected from polymethylvinylketone.

The polymer compound, the ionic liquid, and the solvent may be included in about 1 wt % to 20 wt %, about 1 wt % to 10 wt %, and about 70 wt % to 98 wt %, respectively, based on the total weight of the composition.

The composition including the polymer compound, the ionic liquid, and the solvent may be prepared in a solution and provided as a positive electrode protective layer 115 on the surface of the positive electrode 114 and/or the separator 113.

The positive electrode protective layer 115 is a polymer film formed by linking the borate-based anion of the ionic liquid to the polymer compound. The positive electrode protective layer 115 may reduce or suppress the transition element ions for a positive active material from being eluted into the electrolyte at high temperatures by trapping transition element ions, such as manganese, in the polymer network that is formed by binding the polymer compound and the borate anion. Accordingly, it may prevent the rapid decrease of battery capacity and cycle-life caused by eluting transition element ions from the positive electrode. Thereby, the application of transition elements such as manganese, which is often not used due to its elution into the electrolyte, may be expanded, and the kind of positive active materials used may be varied.

The negative electrode 112 includes a current collector and a negative active material layer positioned on the current collector.

The negative electrode current collector may be selected from a copper foil, a nickel foil, a stainless steel foil, a titanium foil, a nickel foam, a polymer substrate coated with conductive metals, and a metal net such as a metal mesh. However, any suitable current collector may be used.

The negative active material layer includes a negative active material, a binder, and a conductive material.

For the negative active material, a compound that reversibly intercalates/deintercalates lithium may be used. Examples of suitable negative active materials include carbon-based negative active materials, compounds capable of alloying with lithium, transition element oxides, compounds being capable of doping and dedoping lithium, compounds being capable of reversibly reacting with lithium, and combinations thereof.

The carbon-based negative active materials may be crystalline carbon, amorphous carbon, or combinations thereof. The crystalline carbon may be non-shaped, or sheet, flake, spherical, or fiber shaped natural graphite or artificial graphite. The amorphous carbon may be soft carbon, hard carbon, carbonized mesophase pitch, fired coke, or the like.

Materials being capable of alloying with lithium include an element selected from Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

Examples of transition element oxides, compounds being capable of doping and dedoping lithium, and compounds being capable of reversibly reacting with lithium may be selected from vanadium oxide, lithium vanadium oxide, Si, $SiO_x$ (0<x<2), Sn, $SnO_2$, composite tin alloys, and combinations thereof.

The binder and conductive material are the same as that used for the positive active material.

The electrolyte includes a non-aqueous organic solvent and a lithium salt.

The non-aqueous organic solvent acts as a medium for transmitting ions taking part in the electrochemical reaction of the battery. The non-aqueous organic solvent may be selected from carbonate-based solvents, ester-based solvents, ether-based solvents, ketone-based solvents, alcohol-based solvents, and aprotic solvents.

Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When linear carbonate compounds and cyclic carbonate compounds are mixed, an organic solvent having a high dielectric constant and low viscosity may also be used. Cyclic carbonate compounds and linear carbonate compounds may be mixed together at a volume ratio of about 1:1 to about 1:9.

Examples of suitable ester-based solvents include methylacetate, ethylacetate, n-propylacetate, dimethylacetate, methylpropionate, ethylpropionate, γ-butyrolactone, decanolide, valerolactone, mevalonolactone, caprolactone, and the like. Examples of suitable ether solvents include dibutylether, tetraglyme, diglyme, dimethoxyethane, 2-methyltetrahydrofuran, tetrahydrofuran, and the like. Examples of suitable ketone-based solvents include cyclohexanone and the like. Examples of suitable alcohol-based solvents include ethanol, isopropyl alcohol, and the like. Examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio can be controlled in accordance with desirable battery performance.

The non-aqueous electrolyte may further include overcharge inhibitor additives such as ethylene carbonate-based solvents, pyrocarbonate, or the like.

Hereinafter, the method of manufacturing a rechargeable lithium battery is described with reference to FIG. 1 and FIG. 2.

First, a polymer compound, an ionic liquid having a borate anion, and a solvent are mixed to provide a positive electrode protective layer composition. Then a positive electrode 114, a negative electrode 112, and a separator 113 are prepared, respectively, and the positive electrode protective layer composition is coated on one surface of the positive electrode 114 and the separator 113. Then the positive electrode 114 and separator 113 are dried at a room temperature or higher to remove the solvent from the positive electrode protective layer composition to provide a positive electrode protective layer 115.

The positive electrode 114 formed with the positive electrode protective layer 115 is disposed facing the separator 113 and hot-pressed at about 100° C. to integrate the positive electrode protective layer 115.

As shown in FIG. 1, a battery 100 includes a positive electrode 114, a negative electrode 112, and a separator 113.

The following examples illustrate the present invention in more detail. These examples, however, should not in any sense be interpreted as limiting the scope of the present invention.

Example 1

Preparation of Positive Electrode Protective Layer Composition 3 wt % of poly(vinylidene fluoride-hexafluoro propylene) (PVdF-HFP, including 5 mole % HFP of the PVdF-HFP), 7 wt % of lithium bis(oxalato)borate (LiBOB), and 90 wt % of ethylmethyl carbonate (EMC) were mixed to provide a positive electrode protective layer composition.

Manufacture of Rechargeable Lithium Battery 90 wt % of $LiMn_2O_4$, 5 wt % of poly(vinylidene fluoride-hexafluoro propylene) (PVdF-HFP), and 5 wt % of acetylene black in N-methylpyrrolidone were mixed to provide a positive electrode slurry. The positive electrode slurry was coated on an Al foil to prepare a positive electrode. In addition, a negative electrode active material was formed of an artificial graphite, and a separator was formed with a polyethylene material film.

The obtained positive electrode protective layer composition was coated on one surface of the positive electrode and the separator and dried. Thereafter, the positive electrode formed with the positive electrode protective layer was disposed facing the separator and hot-pressed at a temperature of about 100° C. to provide a 5 um-thick positive electrode protective layer.

1.15M of $LiPF_6$ was added into an organic solvent in which ethylene carbonate (EC), ethylmethyl carbonate (EMC), and diethyl carbonate (DEC) were mixed in a volume ratio of about 1:1:1 to provide an electrolyte. The electrolyte was injected into an electrode assembly made of the positive electrode, the negative electrode, and the separator, thus providing a rechargeable lithium battery cell.

Comparative Example 1

A rechargeable lithium battery cell was manufactured according to the same procedure as in Example 1, except that the positive electrode protective layer was not provided.

Comparative Example 2

A rechargeable lithium battery cell is manufactured according to the same procedure as in Example 1, except that aluminum oxide ($Al_2O_3$) was coated on one surface of the positive electrode and the separator instead of the positive electrode protective layer composition of Example 1.

Performance Test

The obtained rechargeable lithium battery cells were charged and discharged at 1 C for 50 times under a temperature of 60° C. and measured for the degree of eluting manganese ion ($Mn^{2+}$) into the electrolyte. The results are shown in Table 1.

TABLE 1

| | $Mn^{2+}$ eluting amount (ppm) |
|---|---|
| Example 1 | Not Detectable |
| Comparative Example 1 | 4000 |
| Comparative Example 2 | 2000 |

As shown in Table 1, the rechargeable lithium battery cell according to Example 1 does not elute manganese ion after the 50th charge and discharge. However, the rechargeable lithium battery cells according to Comparative Examples 1 and 2 elute at least some manganese ion.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A positive electrode protective layer composition of a rechargeable lithium battery, comprising:
    a polymer compound selected from the group consisting of ester-containing polymer compounds; and
    an ionic liquid including a borate-based anion, wherein the polymer compound and the borate-based anion are configured to be linked to each other and reduce elution of transition elements from a positive electrode,
    wherein the ester-containing polymer compound is selected from the group consisting of substituted and unsubstituted carboxylate-containing polymer compounds, substituted and unsubstituted (meth) acrylate-containing polymer compounds, and combinations thereof,
    wherein the composition further comprises a solvent,
    wherein the polymer compound, the ionic liquid, and the solvent of the positive electrode protective layer composition are included at about 1 wt% to 20 wt%, about 1wt% to 10 wt%, and about 70 wt% to 98 wt%, respectively, based on the total weight of the positive electrode protective layer composition.

2. The positive electrode protective layer composition of claim 1, wherein the borate-based anion comprises an anion selected from the group consisting of bis(oxalato)borate (BOB), difluorooxalatoborate (FOB), bis(malonato)borate (BMB), bis(perfluoropinacolato)borate (BPFPB), tetrafluoroborate, triborate ($B_3O_7^{5-}$), tetraborate ($B_4O_9^{6-}$), metaborate ($[BO_2^-]_n$), and combinations thereof.

3. The positive electrode protective layer composition of claim 1, wherein the polymer compound comprises a copolymer of a first compound selected from the group consisting of substituted and unsubstituted carboxylate-containing polymer compounds, substituted and unsubstituted (meth) acrylate-containing polymer compounds, and combinations thereof, and a second compound selected from the group consisting of diol-based compounds, aromatic vinyl compounds, and combinations thereof.

4. The positive electrode protective layer composition of claim 1, wherein the ionic liquid comprises a cation selected from the group consisting of lithium cations, substituted and unsubstituted imidazolium cations, substituted and unsubstituted piperidinium cations, substituted and unsubstituted pyrolidinium cations, substituted and unsubstituted pyrazolium cations, substituted and unsubstituted triazolium cations, substituted and unsubstituted isotriazolium cations, substituted and unsubstituted triazolium cations, substituted and unsubstituted oxazolium cations, substituted and unsubstituted isooxazolium cations, substituted and unsubstituted pyridazinium cations, substituted and unsubstituted pyrimidinium cations, substituted and unsubstituted pyrazinium cations, substituted and unsubstituted pyridinium cations, substituted and unsubstituted isotriazolium cations, substituted and unsubstituted azathiazolium cations, substituted and unsubstituted oxothiazolium cations, substituted and unsubstituted oxaborolium cations, substituted and unsubstituted dithiazolium cations, substituted and unsubstituted selenozolium cations, substituted and unsubstituted oxaphospholium cations, substituted and unsubstituted pyrollium cations, substituted and unsubstituted borolium cations, substituted and unsubstituted furanium cations, substituted and unsubstituted thiophenium cations, substituted and unsubstituted pentazolium cations, substituted and unsubstituted indolium cations, substituted and unsubstituted indolinium cations, substituted and unsubstituted tetrazolium cations, substituted and unsubstituted benzofuranium cations, substituted and unsubstituted dibenzofuranium cations, substituted and unsubstituted benzothiophenium cations, substituted and unsubstituted dibenzothiophenium cations, substituted and unsubstituted thiadiazolium cations, substituted and unsubstituted piperazinium cations, substituted and unsubstituted morpholinium cations, substituted and unsubstituted pyranium cations, substituted and unsubstituted annolinium cations, substituted and unsubstituted phthalazinium cations, substituted and unsubstituted quinazolinium cations, substituted and unsubstituted quinazalinium cations, substituted and unsubstituted quinolinium cations, substituted and unsubstituted isoquinolinium cations, substituted and unsubstituted thazinium cations, substituted and unsubstituted oxazinium cations, substituted and unsubstituted azaannulenium cations, substituted and unsubstituted phosphonium cations, substituted and unsubstituted ammonium cations, and combinations thereof.

5. A rechargeable lithium battery comprising:
a positive electrode,
a negative electrode,
a separator between the positive and negative electrodes,
a positive electrode protective layer between the positive electrode and separator, the positive electrode protective layer comprising a polymer compound linked to a borate-based anion; and
an electrolyte comprising a non-aqueous organic solvent,
wherein the polymer compound is selected from the group consisting of ester-containing polymer compounds, and the ester-containing polymer compound is selected from the group consisting of substituted and unsubstituted carboxylate-containing polymer compounds, substituted and unsubstituted (meth)acrylate-containing polymer compounds, and combinations thereof,
wherein the positive electrode protective layer is formed from a positive electrode protective layer composition comprising the polymer compound, an ionic liquid including the borate-based anion, and a solvent,
wherein the polymer compound, the ionic liquid, and the solvent of the positive electrode protective layer composition are included at about 1 wt% to 20 wt%, about 1wt% to 10 wt%, and about 70 wt% to 98 wt%, respectively, based on the total weight of the positive electrode protective layer composition.

6. The rechargeable lithium battery of claim 5, wherein the borate-based anion comprises an anion selected from an ion selected from the group consisting of bis(oxalato)borate (BOB), difluorooxalatoborate (FOB), bis(malonato)borate (BMB), bis(perfluoropinacolato)borate (BPFPB), tetrafluoroborate, triborate ($B_3O_7^{5-}$), tetraborate ($B_4O_9^{6-}$), metaborate ($[BO_2^-]_n$), and combinations thereof.

7. The rechargeable lithium battery of claim 5, wherein the ester-containing polymer compound comprises a copolymer of a first compound selected from the group consisting of substituted and unsubstituted carboxylate-containing polymer compounds, substituted and unsubstituted (meth)acrylate-containing polymer compounds, and combinations thereof, and a second compound selected from the group consisting of diol-based compounds, aromatic vinyl compounds, and combinations thereof.

* * * * *